Feb. 16, 1943.　　D. G. MOORE　　2,310,985
MOTION PICTURE AND SOUND PROJECTOR
Filed April 29, 1941　　6 Sheets-Sheet 2
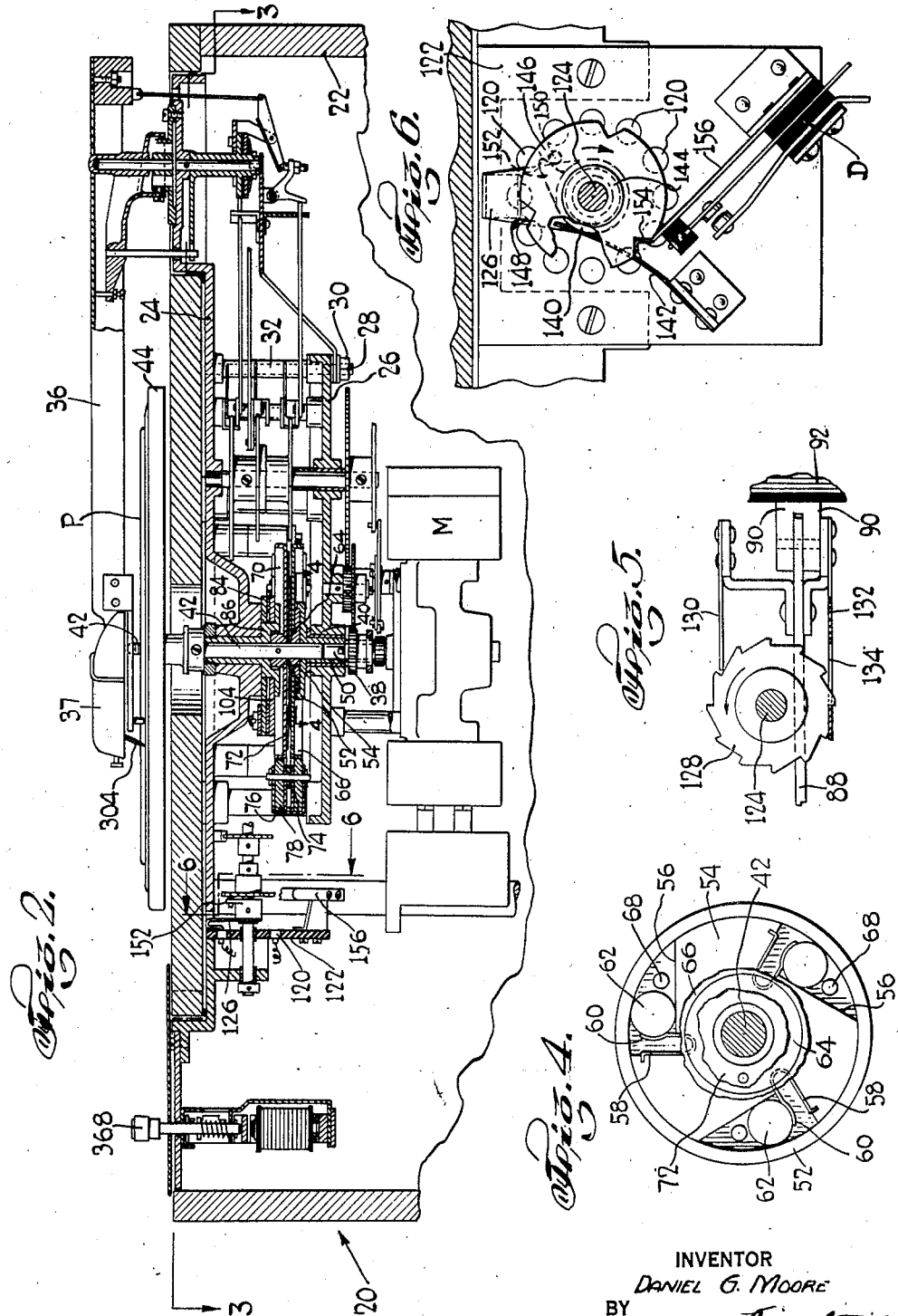
INVENTOR
DANIEL G. MOORE
BY
ATTORNEY

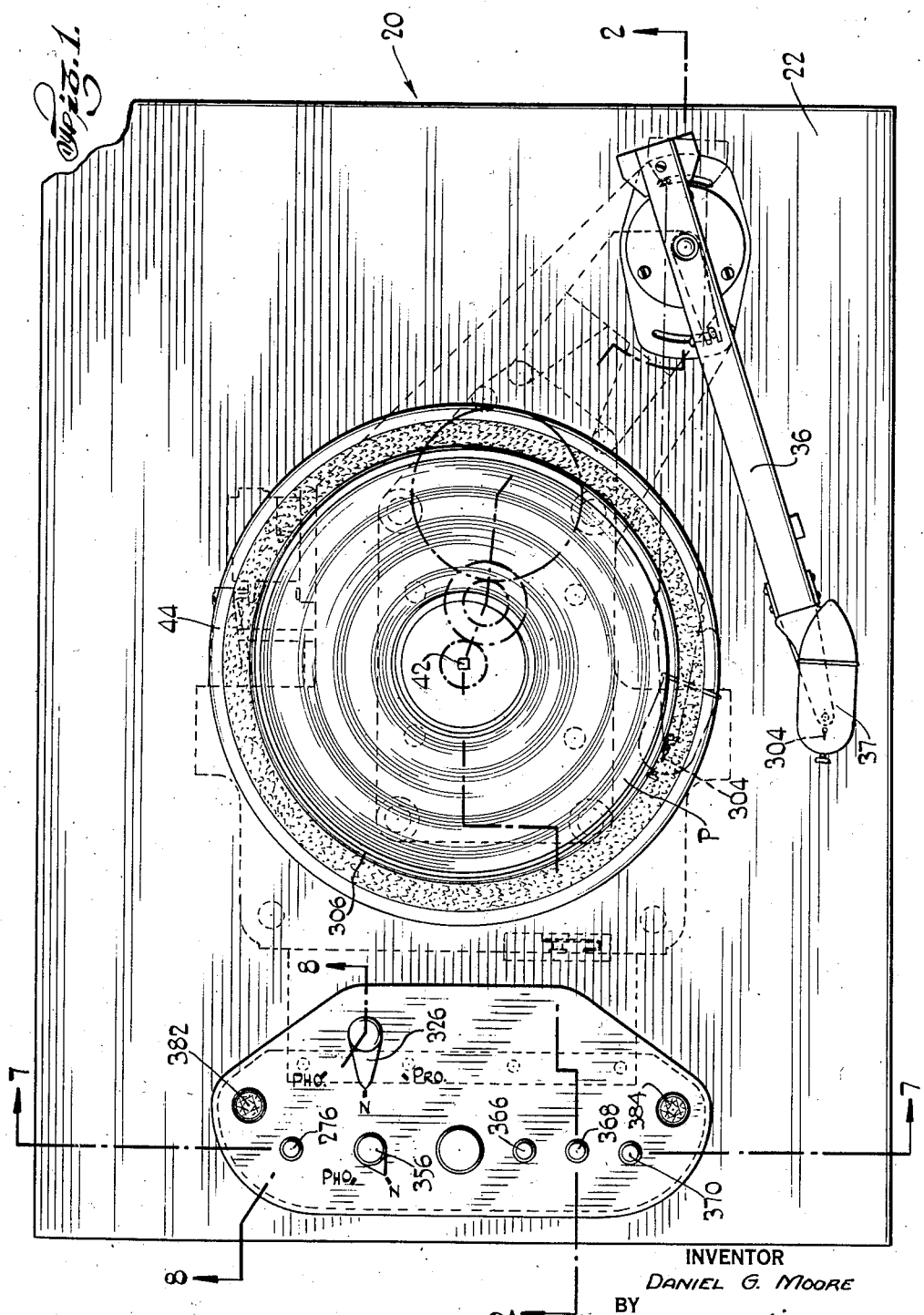

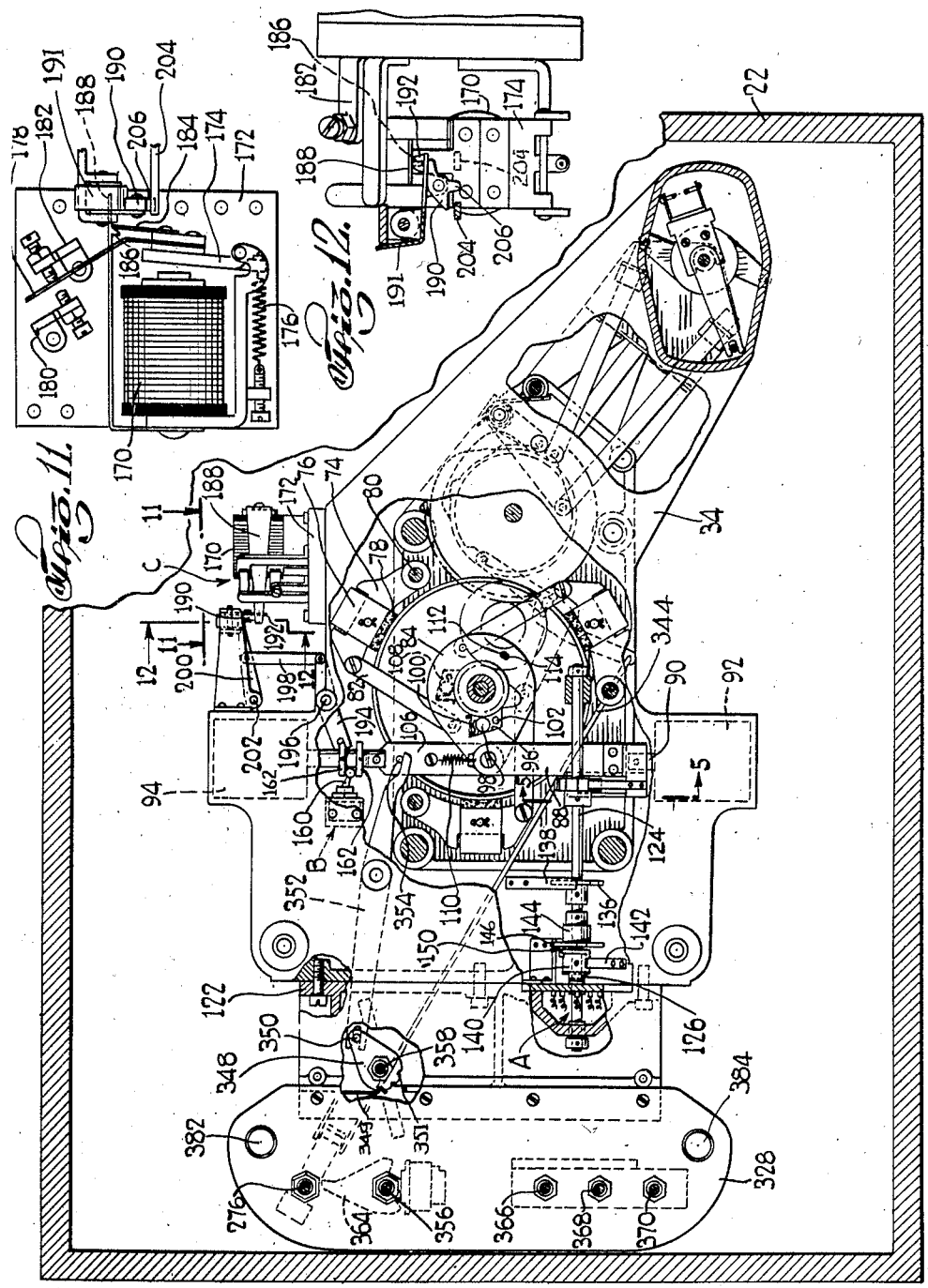

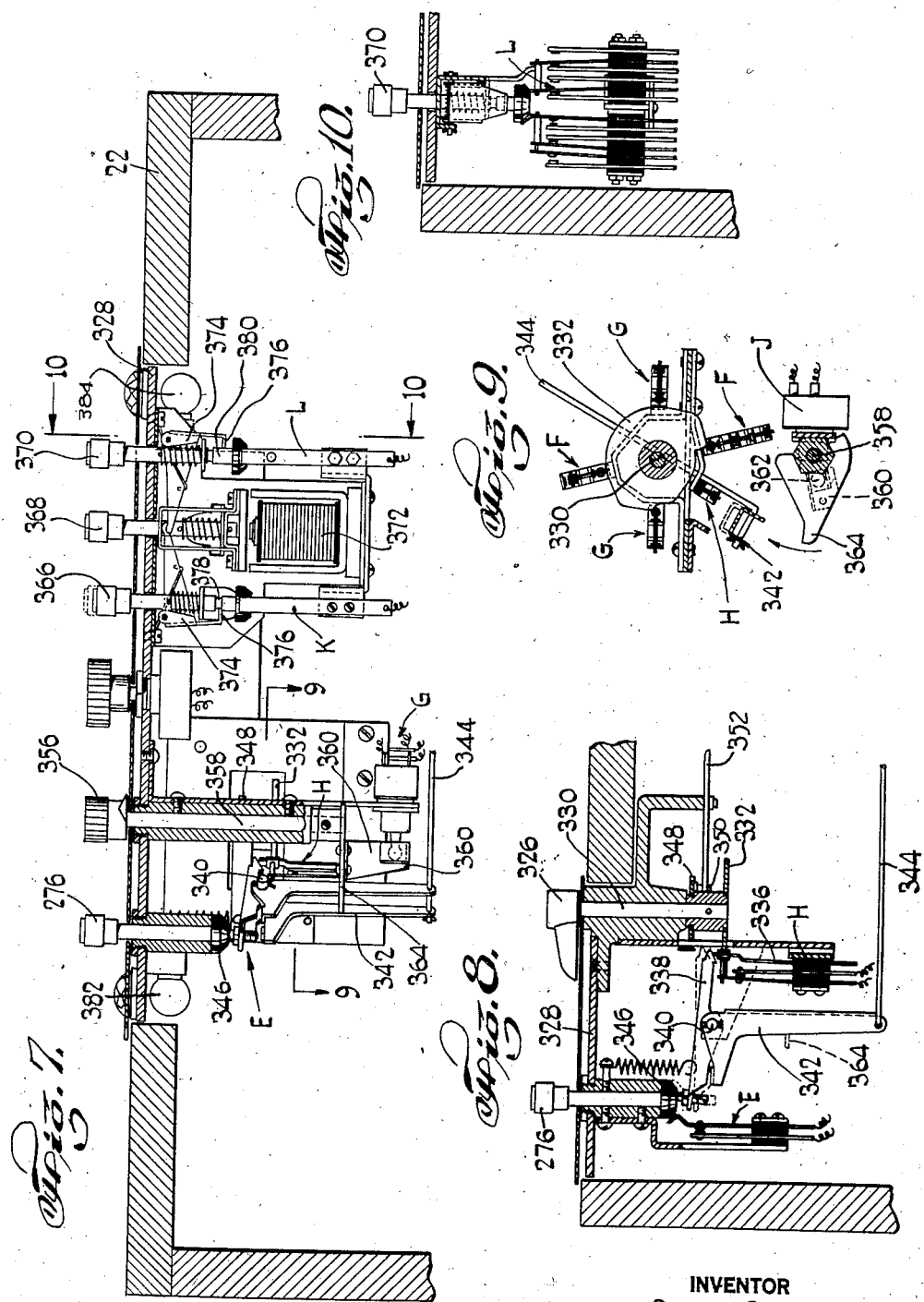

Feb. 16, 1943.　　　　D. G. MOORE　　　　2,310,985
MOTION PICTURE AND SOUND PROJECTOR
Filed April 29, 1941　　　6 Sheets-Sheet 5

INVENTOR
DANIEL G. MOORE
BY
ATTORNEY

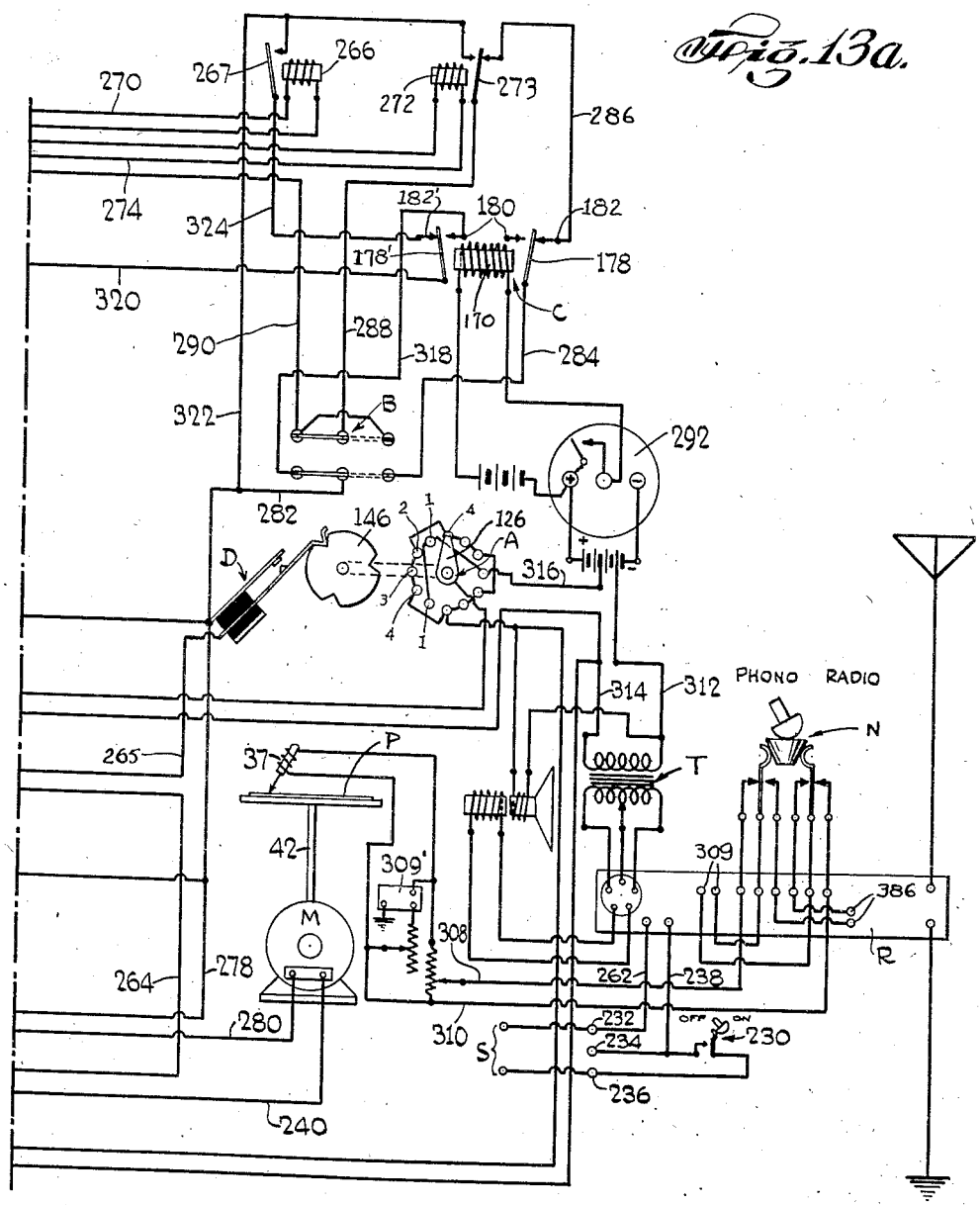

Patented Feb. 16, 1943

2,310,985

UNITED STATES PATENT OFFICE 2,310,985

MOTION PICTURE AND SOUND PROJECTOR

Daniel G. Moore, Brooklyn, N. Y., assignor to Willard B. Kapper, New York, N. Y.

Application April 29, 1941, Serial No. 390,975

32 Claims. (Cl. 88—16.2)

This invention relates generally to motion picture and sound apparatus. More particularly my invention relates to an improved method and means for synchronizing a sound producing apparatus with a motion picture projector apparatus.

One of the objects of my invention is to provide an improved method and apparatus for synchronizing a motion picture film with a sound record, in which the film may be automatically synchronized with any standard sound producing record of any size or shape, without in any way marring or in any other way altering the record, and which is adapted for use in synchronizing a motion picture film and a sound record that have been made independently.

Another object of my invention is to provide an improved method and apparatus for synchronizing a film and a sound record in which the normal recorded sound on the record is utilized for effecting such synchronization.

Still another object of my invention is to provide an improved method and apparatus for synchronizing a film with a sound record which shall be simple in construction and easy to operate, which shall be relatively inexpensive to manufacture and to maintain, and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

Certain features of the apparatus shown or described or referred to but not claimed herein are shown, described and claimed in application Serial No. 392,825, filed May 10, 1941, by Heinz Recker, for Phonographs, and my application for Motion picture projector, Serial No. 354,131, filed August 24, 1940.

This application is a continuation in part of my co-pending application for Motion picture and sound apparatus, Serial No. 263,581, filed March 23, 1939.

In the accompanying drawings, in which is shown one of the various possible embodiments of this invention, Fig. 1 is a top plan view of a phonograph embodying my invention, Fig. 2 is a sectional view taken along the line 2—2 of Fig. 1;

Fig. 3 is a sectional view taken substantially along the line 3—3 of Fig. 2;

Fig. 4 is a sectional view taken substantially along the line 4—4 of Fig. 2 and showing the clutch construction;

Fig. 5 is a sectional view taken substantially along the line 5—5 of Fig. 3 and is explanatory of the stepping cam;

Fig. 6 is a sectional view taken substantially along the line 6—6 of Fig. 2 and showing the stepping switch in detail;

Figure 13:
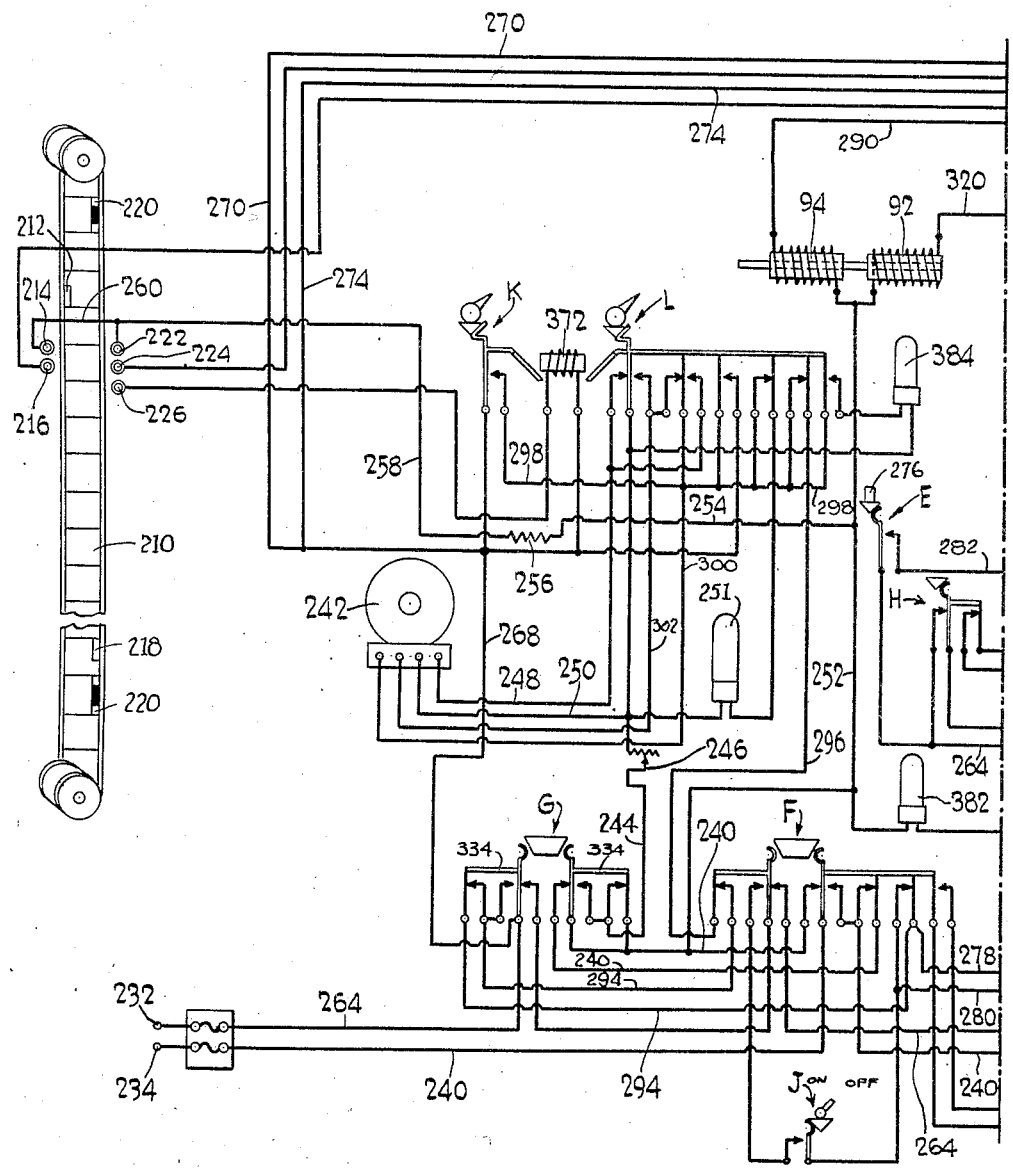

Figs. 7 and 8 are sectional views taken substantially along the lines 7—7 and 8—8 respectively of Fig. 1 and showing details of the various manually controlled switches;

Figs. 9 and 10 are sectional views taken substantially along the lines 9—9 and 10—10 respectively of Fig. 7 and showing further details of said switches;

Figs. 11 and 12 are enlarged sections taken substantially along the lines 11—11 and 12—12 respectively of Fig. 3 and showing the holding relay in detail; and Figs. 13 and 13a placed together at the dot-and-dash lines represent a wiring diagram illustrating the connections between schematically shown elements of the apparatus embodying my invention.

My invention may be satisfactorily employed in connection with any sound reproducing device, such as for example the type employing a phonograph record and an electric pick-up. My invention operates on the general principle of starting the operation of the projector and phonograph on portions thereof which are not designed to be synchronously operated, as for example the initial portion of a record track on which no sound is recorded and the initial portion of the film with which no sound is to be associated (e. g. a blank portion of film, title, cast of characters, credit list, etc.). As soon as the first generated sound is emitted, the operation of the phonograph is instantly stopped and the phonograph is maintained in such ineffective condition while the projector continues to operate until a predetermined portion of the film has been reached, with which portion the initial sound is to be synchronized. At this time the phonograph is automatically and instantaneously rendered effective to start the operation thereof in synchronism with the moving film. I also provide means to automatically stop the operation of both the projector and phonograph after a predetermined period of travel of the film.

Referring now in detail to the drawings and more particularly to Figs. 1 through 5, I have there shown a phonograph 20 embodying my invention. Said phonograph comprises a casing 22 in which is mounted a support comprising a pair of spaced parallel plates 24 and 26 interconnected by means of a plurality of bolts 28, nuts 30 and spacing sleeves 32. The upper plate has an extension arm 34 running to the rear and side of the phonograph casing 22 and supports a phonograph tone arm 36, as shown in Figs. 1 through 3. Said tone arm has a conventional electric pick up 37 and may be actuated by an automatic positioning mechanism such as that shown and described in said application Serial No. 392,825.

Suspended from the lower plate 26 is an oversize motor M whose drive shaft 38 is journalled in a bearing 40 integral with the plate 26. The drive shaft 38 is connected to brake and clutch mechanisms, hereinafter described in greater detail, which actuate a phonograph turntable shaft 42 journalled in the upper plate 24. Fixed on said shaft 42 for revolution therewith is a felt covered turntable 44 of conventional shape and manufacture.

The clutch and brake mechanisms are so constructed and arranged that upon emission of a sound while the phonograph shaft 42 is being actuated, said shaft will be immediately stopped and the driving connection between this shaft and the drive shaft 38 simultaneously and immediately broken. Such quick and synchronous operation of the brake and clutch is difficult to obtain by separately actuated brake and clutch mechanisms and for this reason I prefer to have the clutch so constructed that operation of the brake automatically causes the clutch to disengage.

In Figs. 2 through 4 I have shown a combined clutch and brake mechanism designed to operate in the manner described. Said mechanism comprises a driving collar 50 pinned to the drive shaft 38 and extending upwardly therefrom to provide a bearing portion in which the lower end of the turntable shaft 42 is journalled. A drive cup 52 is integrally formed at the top end of the said drive collar 50 and cooperates with a hardened cam 54 to form the clutch. The cam 54 is mounted for rotation about the shaft 42 and has a plurality of tapered notches 56 around its periphery. At the wide end of each notch there is provided a spring 58 having a free end 60 projecting into the notch and disposed against a roller 62 positioned in the notch 56. Said roller is of such diameter that when located near the broad end of the notch 56 it will touch both the inner edge of the cup 52 and the side wall of the notch 56, the spring 60 normally urging said roller into contactive relationship with these two surfaces. Said cam 54 also has a raised central circular platform 64 on which there is mounted, so as to be in frictional engagement therewith, a centrally apertured brake drum 66, said drum being clear of the driving cup 52. Extending downwardly from the drum into the cam notches 56 are pins 68 disposed a short distance away from the rollers 62 and on the opposite side from the springs 58. A second brake drum 70 positioned immediately above the brake drum 66 is mounted for rotation with the turntable shaft 42. To frictionally interconnect the brake drum 70 and cam 54, I provide a spring member 72 comprising a plurality of radially extending spring fingers integrally connected at their inner ends to each other where they are pinned to the top surface of the platform 64, and frictionally bearing at their outer ends against the under surface of the brake drum 70.

It will be seen that when the motor M rotates the drive shaft 38 in a clockwise direction (as viewed from Fig. 4), the rollers 62 will be jammed in the notches 56 between the driving cup 52 and the cam 54, causing the cam and cup to rotate together. Torque is transmitted from the cam 54 to the brake drum 70 by the friction slip drive comprising the spring member 72 to thus revolve the turntable shaft 42. During the transmission of power, the brake drum 66 is turned simultaneously with the drum 70 by frictional contact with the cam 54.

When the brake drum 66 is stopped the pins 68 will move into contact with the rollers 62 to force said rollers toward the wide end of the notch against the pressure of the spring 58. This movement will cause the rollers to lose contact with one or both of the walls of the notch 56 and cup 52, and thus break the driving train between said cup 52 and the cam 54. If, at this time, the brake drum 70 is simultaneously halted, it will be seen that in one braking action, which stopped the drums 66 and 70, the clutch is disengaged and the turntable shaft 42 stopped. When the brake is released and the clutch engaged, the turntable 44 will immediately resume its proper speed of rotation due to use of the oversize motor M and the continued operation of said motor during the declutched period of the operative cycle.

The braking mechanism which performs this function includes a plurality of brake arms 74 each pivotally supporting a brake shoe 76 carrying suitable braking material, such as asbestos blocks 78, adapted to bear against the outer surface of the brake drums 66 and 70. Said arms 74 are pivoted at one end on shafts 80 mounted on the support plates 24 and 26. The other end of said arms is interconnected by means of a pivotally mounted link 82 to a brake plate 84 rotatably mounted on the outer surface of a bearing 86 in which the turntable shaft 42 is journalled. Said brake plate 84 also has pivotally mounted thereon a brake bar 88 which forms an extension of the armature 90 of a braking solenoid 92.

Thus, when the solenoid 92 is energized it will cause the braking plate 84 to turn in a counterclockwise direction (as viewed from Fig. 3) to urge the asbestos block 78 against the periphery of the brake drums 66 and 70, and thereby simultaneously stop the turntable shaft and disengage the clutch.

I have also found it desirable to provide a mechanical holding mechanism for both the brake and clutch which will allow the brake solenoid 92 and the clutch solenoid 94 to be deenergized after they have performed their function, without affecting the operation of the brake or clutch. The brake holding means comprises a tapered notch 96 in the brake plate 84 adjacent the hardened outer circular surface of the bushing 86. Said notch flares in a direction opposite to the direction of braking movement; that is, in a clockwise direction. Disposed in the notch is a roller 98 which is urged towards the shallow portion of said notch by a spring 100 supported at the broadest portion of the notch. The roller 98 is of such diameter that it will contact both the surface of the notch and the outer surface of the bushing 86 near the wide end of the notch under the action of the spring 100.

When the solenoid 92 is energized to move the brake plate 84 in a counterclockwise direction and apply the brakes, the roller 98 will move along in the notch under the influence of the spring 100. When the solenoid 92 is then deenergized the roller 98 will be jammed in the notch 96 and prevent retrograde movement of said plate 84.

To release the roller 98 and brake plate 84 a pin 102 is disposed in the notch 96 behind the roller 98 on the opposite side thereof from the spring 100. The pin is connected to a lower clutch plate 104 mounted like the brake plate 84 on the bushing 86, and it will be clear that when the pin 102 is caused to rotate in a clockwise direction it will press the roller 98 against the spring and disengage it from the walls of the notch 96 and bushing 86 to permit retrograde or clockwise movement of the brake plate 84. Such movement of the pin 102 is obtained by interconnecting the clutch plate 104 to the clutch solenoid 94 by means of a clutch bar 106. Means 108, similar to the interlocking means, including the pin 102, notch 96, roller 98 and spring 100, is provided in association with the clutch plate 104 to lock the same in position after said plate has been actuated by the clutch solenoid 94. However, the direction of flare of the notch in the means 108 is opposite to that of the notch 96.

It will be seen that in order to permit disengagement of the locking means associated with the brake and clutch plates 84 and 104, it is necessary for either plate to be rotated a short distance before the other plate is unlocked, and then for both of the plates to move together. To insure such movement, I interconnect the brake and clutch bars 88 and 106 by a spring 110 and also provide a pin 112 projecting upwardly from the clutch plate 104 and disposed in a short arcuate slot 114 in the brake plate 84.

Operated by the brake and clutch bars 88 and 106 are a plurality of electrical switching mechanisms which control the electric circuit, hereinafter described, for synchronizing the operation of the phonograph and a film projector. Said switches comprise a stepping switch A which controls the cycle of operation, a toggle switch B which disconnects the energizing circuit subsequent to actuation of either the brake or clutch solenoid and readies the energizing circuit of the opposite solenoid, and a locking relay C initially actuated by the first sound emitted from a phonograph record and which maintains certain circuits energized as long as the brake is applied but which opens said circuits when the clutch is engaged.

The switch A, which is best shown in Figs. 2, 3, 5 and 6, comprises twelve contact points 120 set in an insulating panel 122 bolted to the upper supporting plate 24. Said pins are disposed in a circle around a stepping shaft 124 and are adapted to be engaged sequentially by a switch arm 126 mounted for rotation on said shaft 124. The shaft 124 is angularly advanced 30° each time either one of the clutch or brake solenoids is actuated by means of a stepping cam 128 fixed to said shaft and having twelve teeth arranged in the form of a ratchet, as shown in Fig. 5. A pair of flat spring pawls 130 and 132, mounted on the brake bar 88, are adapted to engage the teeth of said cam 128. The upper of said spring pawls 130 consists of a piece of flat stock of resilient material of substantially the width of said cam 128, while the lower of said pawls 132 is provided with an elongated slot 134 slightly greater than the width of said cam 128.

Said pawls 130 and 132 are so arranged relative to the cam 128 that upon actuation of the clutch solenoid 94, which pulls over the brake bar 88 by means of the spring 110 and pin-and-slot connection 112—114, the upper pawl 130 will strike the bottom of the radial side of a cam tooth disposed above the shaft 124 and rotate the cam 128 30° in a counter-clockwise direction (as viewed from Fig. 5). At the same time, the tip of the pawl 132 will ride over the apex of a cam tooth disposed below the shaft 124 and at the completion of the stroke rotating the cam, the forward portion of the slot 134 will lie near the radial side of the lower tooth. Thus, upon subsequent energization of the brake solenoid 92 and retraction of the brake bar 88, the pawl 132 will advance the cam 128 another 30°, while the upper spring pawl 132 rides over the apex of a cam tooth above the shaft 124. A check cam 136 and spring pawl 138 may be provided to prevent retrograde movement of the cam 128.

The wiping switch 126 is carried on a metallic collar 140 fixed to the shaft 124 and electrical contact is made with said switch by means of a wiping spring 142 which rides on said collar. Floating on the stepping shaft 124 is another collar 144 which carries a cam 146 having three equidistant switch opening notches 148. Said cam has a projecting pin 150 which is adapted to be engaged by a dog 152 integral with collar 140 whereby the shaft 124 drives the cam 146 through the dog 152 and pin 150. A telephone switch D is so disposed relative to the cam 146 that the circuit in which it is connected will be completed through the switch at all times save when a projection 154 on one of the switch prongs 156 is located in one of the notches 148.

It will be seen that by employing the pin-and-dog construction 150—152, above described, even if the cam 128 should be rotated slightly less than a full 30° at the time a notch 148 is to be disposed under the projection 154, the cam 146 will ride ahead of the pin 150 once the projection 154 begins to enter a notch 148 so as to make certain that the circuit formed through the switch D will be broken.

The switch B is a double-throw, double-pole switch of standard construction having an operating lever 160 disposed between two collars 162 carried on the clutch bar 106, said switch being of the type wherein the moving contacts are rapidly thrown from one set of poles to the other at the end of an actuating stroke. In Fig. 13a the dotted lines associated with the switch B indicate the connections made through said switch when the brake is on and the full lines indicate the connections through said switch when the clutch is engaged.

Switch C (see Figs. 3, 11 and 12) is a double-pole, double throw switch which is thrown in one direction upon emission of the first sound from the phonograph record and in the other direction upon engagement of the clutch. However, operation of the brake has no effect upon said switch C. The switch must also be so constructed that when it is thrown by the first emitted sound it will remain locked in this position until the clutch solenoid is energized. To accomplish these functions, I have provided the following construction:

The solenoid 170 of the switch is suitably mounted upon a baseboard 172 which is bolted between the upper and lower support plates 24 and 26. Said solenoid is provided with a pivotally mounted armature 174 biased away from the solenoid 170 by a spring 176. The armature 174 carries a pair of contacts 178 which move between fixed pairs of contacts 180 and 182. The contacts 178 are held against the contacts 182 when the clutch is engaged and against the contacts 180 when the solenoid 170 is energized.

Since the solenoid 170, as will be later seen, is energized by a highly sensitive relay which it is not desired to leave in the circuit, means is provided to hold the contacts 178 against the contacts 180 after potential has been removed from said solenoid. Such means may comprise a prong 184 carried on the armature 174 and adapted to ride over a cam lock 186 carried on a long flat spring 188 fixed to one of the brackets supporting the solenoid 170.

It will be seen that when the solenoid 170 is energized to attract the armature 174, the prong 184, which is disposed on the sloped side of the cam lock 186, will depress the cam lock and supporting spring 188 until it clears the high point of said cam. The cam 186 will then move towards said prong and hold the same in position against the flat side after the solenoid 170 is de-energized.

In order to release the prong 184 and armature 174 upon energization of the clutch solenoid 94, I provide a trip dog 190 underlying a pivotally mounted lever 191 on which is fixed an upwardly extending finger 192 adapted to move the spring 188 away from the prong 184 upon counterclockwise rotation of said dog (as viewed from Fig. 12). To obtain such movement of the dog I employ a linkage system comprising a lever 194 having a forked end which straddles one of the collars 162. Said lever is pivoted at 196 on the upper supporting plate 24 and the other end thereof is pivotally connected by a link 198 to another lever 200. The lever 200 is pivoted at one end 202 to the said supporting plate 24 and the other end of said lever carries a tripping arm 204 which is arranged to move in a path which intersects the normal position of a finger 206 depending from the dog 190.

When the clutch solenoid 94 is energized the arm 204 will move from its full line position to the dotted line position (shown in Fig. 12). In the course of this movement the arm will strike the finger 206, causing the dog 190 to turn in a counterclockwise direction and bring about the result above described. During a subsequent stage of the operative cycle, the brake solenoid 92 is energized, thus returning the arm 204 to the full line position shown in Fig. 12 and rotating the dog 190 in a clockwise direction without affecting the operation of the switch C.

Any desired type of projector mechanism may be employed, such as for example that shown and described in my aforesaid application for motion picture projectors, in which a film 210 (shown diagrammatically in Fig. 13 of the drawings) is fed therethrough. At a point on the film where the action begins, or any other point at which it is desired to simultaneously start the sound, a relatively short electrically conductive member 212 is attached at one edge of the film. The said conductive member may be in the form of a small piece of tinfoil or similar material which is designed to be contactively engaged by a pair of cooperating stationarily disposed rollers 214 and 216 suitably mounted on the projector and adapted to complete an electrical circuit for the purpose of synchronizing the operation of the film 210 and the phonograph record P in a manner soon to be described.

At a further point along the film where the action stops, or at which it is desired to stop the reproduction of sound in synchronous operation with the projector, a similar second relatively short electrically conductive member 218 is attached at the opposite edge of the film.

Another pair of conducting strips 220 are provided at both ends of the strip on the same edge as that on which the member 218 is disposed to stop the projector when same is not being run in synchronous operation with the phonograph record. These strips 220 are longer than the strips 212 and 218 and have their central portions covered with insulating material, such as paper, so that only the two ends are exposed for electrical contact. The strips 218 and 220 are adapted to cooperate with roller switches 222, 224, 226, similar to the switches 214 and 216; the switches 222 and 224 are adapted to cooperate with the conducting strip 218 to stop the operation of the projector and phonograph when same are running synchronously and the switches 222 and 226 are adapted to cooperate with the strips 220 to stop the projector when the same is running independently of the phonograph.

The operation of my invention to automatically synchronize the movement of the film 210 with the phonograph record will now be described; particular attention being given to the circuit diagram shown in Figs. 13 and 13a wherein the various parts are shown at the beginning of a cycle of operation where neither the projector nor phonograph have been started.

A proper record P is placed on a turntable and the corresponding film 210 is properly threaded in the projector. The various controls, later to be described in detail, are arranged as shown in Figs. 13 and 13a so that the projector and phonograph may be operated synchronously. A master switch 230 (mounted on the radio) is then closed. This will energize the terminal 234 from a source of power S and terminal 236.

From terminal 234 current is fed to the audio-amplifying stages of the radio R through the lead 238; to one side of the phonograph motor M through the lead 240; to one side of each of the fields of the reversible projector motor 242 through the leads 240 and 244, speed control resistance 246 and leads 248 and 250; to one side of projector lamp 251; to one side of the clutch and brake solenoids 92 and 94 through the leads 240 and 252; and to the roller switches 214 and 222 through leads 240, 252 and 254, voltage drop resistance 256 and leads 258 and 260.

From the other terminal 232 current is fed to the audio-amplifying stages of the radio R through the lead 262; to one side of the switch D through the lead 264, switch H and lead 265; to one side of the synchronous stopping relay 266 through the leads 268 and 270; and from the lead 268 to one side of the synchronous starting relay 272 through the lead 274.

Certain other leads and contacts will also be energized as will be apparent from tracing out the wiring diagram in Figs. 13 and 13a in the event that other than synchronous operation of the projector and phonograph or independent operation of the radio is desired. These operations will be generally discussed at a later point in the specification.

I next depress the synchronous starting key 276 to close the circuit through spring switch E and bridge the jack switch D. This causes the current from the terminal 232 to be fed from switch E through the leads 278 and 280 to the phonograph motor so as to start the same in operation. At the same time current will be fed from switch E to the clutch solenoid 94 through lead line 282, toggle switch B (the dotted line connection being followed since the brake is now on), lead line 284, pivoted contact 178 and fixed contact 182 of switch C (which is in de-energized position), lead line 286, through the pivoted contact 273 of the "on" relay 272 (which is in de-energized position), back again to the toggle switch B by lead line 288, through the toggle switch and out to the solenoid 94 through lead line 290.

Upon energization of the solenoid 94 the cam plate 146 will be advanced by means of the stepping cam 128 to close the switch D. Also, the wiping lever 126 will be advanced from contact pin 4 to contact pin 1 where a supersensitive relay 292 will be connected to the output of audio stages of the radio R through switch H, thereby preparing said relay to operate upon the emission of the first recorded sound on the phonograph record P.

While the phonograph motor is being started and the stepping cam actuated, the fields of the projector motor 242 will be energized from terminal 232 and lead line 278 through leads 294, 296, 298, 300 and 302.

It should be noted that after the clutch solenoid 94 has been energized to advance the stepping cam 128 30°, the toggle switch B will be thrown to its full line position to thereby de-energize the clutch solenoid which will remain electrically inactive until a later step in the operative cycle, although the clutch mechanism itself will continue to be engaged due to the action of the mechanical locking device 108. When the key 276 is released power will still be supplied to continue operating the projector and phonograph motors 242 and M through the switch D due to the angularly changed position of the cam 146. At this time then, immediately after depression and release of the key 276, the projector motor and phonograph motor will be operating and the turntable shaft 42 will be rotated through the clutch mechanism.

The tone arm 36 may then be automatically positioned, as more fully described in said application Serial No. 392,825, so that the phonograph needle 304 is in the starting groove 306 of the record P where no sound is recorded. The record P continues to rotate until the needle 304 reaches the portion of the sound groove wherein the first sound is recorded. The electrical impulse proceeding therefrom will pass into audio input terminals 309 through the leads 308 and 310 and switch N (mounted on the radio), being amplified therein, and then passing through transformer T, lead lines 312 and 314, switch H, switch arm 126, contact pin 120 in position 1 and lead line 316 to the supersensitive relay 292, thereby energizing solenoid 170 and actuating switch C. This will cause the moving contacts 178 and 178' to engage the contacts 180, opening the above described circuit to the clutch solenoid 94 and closing the circuit from the terminal 232 and lead line 282 to the brake solenoid 92, through toggle switch B which is now in full line position, lead line 318, contacts 180 and 178', and lead line 320. Energization of this solenoid will first disengage the clutch and apply the brake to instantaneously stop rotation of the phonograph record with the needle 304 disposed immediately adjacent the portion of the sound groove having the first sound contained therein. It may be noted that due to the abrupt stop of the shaft 42 and turntable 44 it is desirable to provide means such as a square head on the shaft 42 and a square cooperating central aperture in the record P to ensure an equally abrupt stop of the record P. At the same time the toggle switch B is thrown to dotted line position to de-energize the brake solenoid 92, the brake being held in operative position by means of its locking mechanism including the roller pin 98 and notch 96. The stepping cam 146 and wiping switch 126 are also advanced 30° with the arm 126 contactively engaging pin 2. Due to the sensitivity of the relay 292 it has been found desirable to employ a filter 309' to prevent said relay from responding to scratch sounds emitted when the needle is in the starting groove 304 of the record.

When the contact 2 is engaged the supersensitive relay 292 is cut out of the circuit and will remain cut out until its proper stage of the next operative cycle. This has been found to be desirable so as to not subject said delicate relay to energization throughout the entire sound reproducing period. Upon de-energization of said relay 292 current will be removed from solenoid 170 but contacts 178 and 178' will continue to engage contacts 180 until clutch solenoid 94 is energized.

The film 210 meanwhile continues to advance and when the conducting strip 212 bridges the rollers 214 and 216 a circuit will be completed to momentarily energize the synchronous "on" relay 272 which will thereupon pull over its armature 273 and thereby supply current to the lead line 290 from the terminal 232 and lead line 282 through lead line 322, armature 273, lead line 288 and toggle switch B which is then in dotted line position. This energization of the clutch solenoid 94 will instantaneously start up the phonograph record P so that its first sound will simultaneously start with the portion on the film 210 adjacent strip 212. As soon as the solenoid 94 has been energized the switch C will be opened, toggle switch B will be thrown to de-energize the solenoid, the stepping cam 146 will move the switch arm 128 to its next position 3, and all the various parts will hold this last assumed position while the phonograph and projector simultaneously and synchronously project motion pictures with a sound accompaniment.

When the film 210 approaches the end of its travel the conductive strip 218 will momentarily bridge the roller switches 222 and 224 to thereby energize the synchronous "off" relay 266 which will attract its armature 267 thereto. This will energize the brake solenoid 92 from terminal 232 and lead 282 through lead 322, armature 267, lead 324, contact 182', armature 178' (note that the prong 184 has been unlocked by the prior engagement of the clutch) and lead 328. The stepping cam will thereupon advance to place the wiping arm 126 on contact pin 4 and to move the cam 146 to a position wherein the projection 154 on prong 156 is disposed in a notch 148 to thereby break the circuit through jack switch D. This latter action will de-energize the projector and phonograph motors and bring the operative cycle to an end. It may be mentioned that the pin and dog connection 150—152 insures breaking of the contact through switch D even though the stepping cam is not thrown a full 30°.

The projector motor and phonograph motor are preferably equipped with governors which are so set so that they will operate at the proper synchronous ratio. Since it is well known that the standard phonograph record is designed for a speed of 75 R. P. M., the projector motor must be regulated accordingly.

In conjunction with the synchronous operation of the phonograph-projector I have also provided a plurality of switching means for independently running either the phonograph or the projector. Various positions of the switches, for convenience, will hereinafter be referred to as normal or N, in which the phonograph and projector are synchronously run; as phonograph operative or "Pho," in which only the phonograph is to be used; and as projector operative or "Pro," in which only the projector is to be used.

The main control is operated by a key 326 mounted on a control panel 328 supported in the phonograph casing 22 and insulating panel 122. Fixed to said key 326 is a shaft 330 carrying a cam member 332 (see Figs. 8 and 9). Said cam member is designed to operate a plurality of switches F, G and H in the following order:

When key 326 is in position N all of the switches F, G and H are in the position shown on the wiring diagram illustrated in Fig. 13. When the key 326 is moved to position "Pro" the switch G is depressed to alter the switching arrangements of said key from that shown in Fig. 13 to a position wherein the spacers 334 are moved away from the shaft 330. In this "Pro" position the circuit is broken in switch G between terminal 232 and the synchronizing circuit, including the brake and clutch solenoids 92 and 94, and the phonograph motor M. When the key 326 is turned to "Pho" position the spacers on the switches F and H will be operated to break the circuit between terminal 232 and the synchronizing circuit, including the brake and clutch solenoids 92 and 94, and the projector motor and phonograph motors 242 and M. Also, once the switch H has been operated to open its contacts it will be held in such open position by a locking prong 336 which is caught by a detent at the end of a lever 338. Said lever 338 is pivoted on a common shaft 340 with a bell crank lever 342 at whose lower end there is attached a rod 344 designed to start an automatic tone arm positioning mechanism, more fully shown and described in said application Serial No. 392,825.

The starting key 276 is mounted on the control board adjacent the selecting key 326 and at its lower end carries a mushroom cam 346 which operates the switch E. Upon initial depression of the key 276 to close the switch E it will be seen that the lever 338 will be turned in a counterclockwise direction to release the switch H if same should be locked in open position and permit the contacts thereof to close. Further depression of the key 276 will actuate the shaft 344 through lever 342.

It will thus be seen that when the phonograph is independently operated the supersensitive relay 292 is removed from the output circuit of the radio by opening the switch H, and the same will not be replaced therein until the synchronous starting key 276 has been depressed.

The shaft 330 also carries a plate 348 having a pin 350 projecting downwardly therefrom. Said pin is received in the bifurcated end of a lever 352 which is pivoted to the upper supporting plate 24 and whose other end rests against a pin 354 on the clutch bar 106 so that when the selective switch 326 is placed in phonograph playing position the clutch will be engaged by mechanical operation. A spring pawl 349 cooperates with a plurality of notches 351 in the periphery of the plate 348 to maintain the key 326 in any selected position.

Since, as above described, when the switch F is operated to dispose it in "Pho" position, current is removed from the phonograph motor, I provide a key 356 which operates the switch J to reconnect the lead 280 of the phonograph motor M to the terminal 232 when a switch F is in such position. This is accomplished by a shaft 358 on which the key 356 is mounted, said shaft carrying a cam member 360 at its lower end for throwing the operating arm 362 of the switch J. A plate 364 is also carried by the said shaft 358, said plate being arranged to contact the lower arm of the bell crank lever 342 and push the rod 344 which actuates the phonograph tone arm positioning controls. The plate 364 and the cam 360 are so disposed relative to each other that the switch J will be thrown to energize and start the phonograph motor M slightly before the bell crank lever 342 is contacted by the said plate 364, whose operative position is shown in dotted line position in Fig. 8.

The keys 366, 368 and 370 mounted on the board 328 are provided to control the operation of the projector when the key 326 is in position "Pro." Said keys 366, 368 and 370 respectively cause the projector motor to operate in a forward direction to stop and to operate in a rewinding direction, and, if desired, means (not shown) may be provided to prevent the key 366 from being depressed and affecting the operation of the projector motor while the switch G is in normal position.

The switches K and L, operated by the keys 366 and 370 respectively, are connected in the circuit in a manner described in my aforesaid copending application for Motion picture projector, Serial No. 354,131, so that depression of the key 366 when the key G is in "Pro" position will cause the circuit to be so arranged that the projector will operate in a forward direction until the two ends of contact strip 220 bridge the roller switches 222 and 226 to energize the relay 372 and stop the projector. Depression of the key 370 will cause reversal of the fields in the motor 242 and drive the projector in a rewinding direction until the ends of the opposite contact strip 220 bridge roller switches 222 and 226 to energize the relay 372 and stop the projector.

Both of the keys 366 and 370 are held in their lower operative positions against spring pressure by mechanical locking devices comprising a lever 374 having a finger 376 which engages an annular depression 378 in a shaft 380 connected to said keys 366 and 370. Energization of the relay 372 will, through the linkage shown in Fig. 7, cause the finger 376 to be removed from the depression 378 to open the circuit supply current to the projector motor 242. Also, depression of the key 368 will operate the same mechanical linkage which releases the fingers 376 so that the projector motor may be stopped at any point intermediate the two contacts 220 by manually depressing said key 368.

If desired, signaling means may be provided on the control board 328 to indicate when the phonograph and projector are in synchronous operation, or when the projector is being run in reverse. Such signaling means may comprise a green lamp 382 which is lit when all keys are in normal position and the switch 230 is thrown. When either the key G or key F is thrown to "Pho" or "Pro" position, said lamp will be extinguished. A red lamp 384 mounted on the control board 328 will be lit when the key 370 is depressed to place the switch L in a projector rewinding position.

To optionally employ either the radio R or phonograph 20 I may provide another switch N (mounted on the radio) which will direct energy either from the phonograph output leads 308, 310 or the detector output terminals 386, as desired, to the audio input terminal 309.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a motion picture projector and sound record reproducer synchronizing apparatus of the character described, means for causing the operation of said projector and said sound reproducer, means for utilizing the sound reproduced by said sound reproducer to automatically render said sound reproducer ineffective at the point where the sound on the record actually starts, and means for maintaining said sound reproducer ineffective for a predetermined period of operation of said projector.

2. In a motion picture projector and sound record reproducer synchronizing apparatus of the character described, means for causing the operation of said projector and said sound reproducer, means for utilizing the sound reproduced by said sound reproducer to automatically render said sound reproducer ineffective at the point where the sound on the record actually starts, means for maintaining said sound reproducer ineffective for a predetermined period of operation of said projector, and means for again automatically rendering said sound reproducer effective after such predetermined period of operation of said projector.

3. In a motion picture projector and sound record reproducer synchronizing apparatus of the character described, means for causing the operation of said projector and said sound reproducer, and means for utilizing the reproduced sound which it is desired to synchronize with the projector for automatically rendering the operation of said sound record reproducer ineffective.

4. In a motion picture projector and sound record reproducer synchronizing apparatus of the character described, means for causing the operation of said projector and said sound reproducer, and means for utilizing the first reproduced sound for automatically rendering said sound reproducer ineffective.

5. In a motion picture projector and sound record reproducer synchronizing apparatus of the character described, means for causing the operation of said projector and said sound reproducer, and means for utilizing the first reproduced sound for automatically rendering said sound reproducer ineffective, said last named means including means for maintaining said sound reproducer ineffective for a predetermined period of operation of said projector.

6. In a motion picture projector and sound record reproducer synchronizing apparatus of the character described, means for causing the operation of said projector and said sound reproducer, and means for utilizing the first reproduced sound for automatically rendering said sound reproducer ineffective, said last named means including means for maintaining said sound reproducer ineffective for a predetermined period of operation of said projector and means for again automatically rendering said sound reproducer effective after such predetermined period of operation of said projector.

7. In combination, a motion picture projector including a movable film, a motor for driving said projector, a sound reproducing device including a movable sound record, a motor for driving said sound reproducing device, means for rendering said motors effective to move said film and said sound record, and means utilizing the first sound reproduced by said sound reproducing device for automatically stopping the movement of said sound record.

8. In combination, a motion picture projector including a movable film, a motor for driving said projector, a sound reproducing device including a movable sound record, a motor for driving said sound reproducing device, means for rendering said motors effective to move said film and said sound record, and means utilizing the first sound reproduced by said sound reproducing device for automatically stopping the movement of said sound record, said last named means including means for maintaining said sound record stationary while permitting the effective operation of said sound reproducing device motor.

9. In combination, a motion picture projector including a movable film, a motor for driving said projector, a sound reproducing device including a movable sound record, a motor for driving said sound reproducing device, means for rendering said motors effective to move said film and said sound record, means utilizing the first sound reproduced by said sound reproducing device for automatically stopping the movement of said sound record, said last named means including means for maintaining said sound record stationary while permitting the effective operation of said sound reproducing device motor for a predetermined period of movement of said film, and means for automatically restarting the movement of said sound record after such predetermined period of movement of said film.

10. A motion picture projector adapted to project a film having an initial portion with which no sound is to be associated, a sound producer including a sound track having an initial portion on which no sound is recorded, said projector and said sound producer being adapted to be first operated on their said initial portions of the film and sound track, and coacting means on said film and said sound track for automatically synchronizing said projector and said reproducer at the termination of the said initial portions of the film and sound track.

11. A motion picture projector adapted to project a film having an initial portion with which no sound is to be associated, a sound producer including a sound track having an initial portion on which no sound is recorded, said projector and said sound producer being adapted to be first operated on their said initial portions of the film and sound track, and coacting means on said film and said sound track for automatically synchronizing said projector and said reproducer at the termination of the said initial portions of the film and sound track, the means on said sound track comprising the initial sound recorded on said sound track.

12. In a motion picture projector and sound record reproducer synchronizing apparatus of the character described, a sound track having an initial portion on which no sound is recorded, pick-up means associated with said sound track, means to move said sound track relative to said pick-up means, and means to render said last named means ineffective when said pick-up means reaches the first sound recording in said sound track.

13. In a motion picture projector and sound record reproducer synchronizing apparatus of the character described, means for causing the operation of said projector and said sound reproducer, and means for utilizing the first reproduced sound for automatically rendering said sound reproducer ineffective, said last named means comprising a thermionic amplifier, a relay connected to said amplifier, and a switch controlled by said relay.

14. In a motion picture projector and sound record reproducer synchronizing apparatus of the character described means for causing the operation of said projector, means for causing the operation of said sound reproducer, means for utilizing the sound reproduced by said sound reproducer to automatically render said sound reproducer operating means ineffective, with the sound reproducer at the point where the sound on the record actually starts, while the projector continues to operate, means to maintain said sound reproducer operating means ineffective for a period of operation of said projector, and means for automatically rendering said sound reproducer operating means effective, said last named means being controlled by the film in said projector.

15. In a motion picture projector and sound record reproducer synchronizing apparatus of the character described means for causing the operation of said projector, means for causing the operation of said sound reproducer, and means for utilizing the reproduced sound which it is desired to synchronize with the projector for automatically rendering said sound reproducer operating means ineffective.

16. In a motion picture projector and sound record reproducer synchronizing apparatus of the character described means for causing the operation of said projector, means for causing the operation of said sound reproducer, and means controlled by the sound reproduced by said sound reproducer for automatically rendering said sound reproducer operating means ineffective, with the sound reproducer at the point where the sound on the record actually starts, while the projector continues to operate.

17. In a motion picture projector and sound record reproducer synchronizing apparatus of the character described means for causing the operation of said projector, means for causing the operation of said sound reproducer, means actuated by the reproduced sound which it is desired to synchronize with the projector for automatically rendering said sound reproducer operating means ineffective while the projector continues to operate, and means to maintain the said sound reproducer operating means ineffective until a predetermined portion of the film in said projector is reached.

18. In a motion picture projector and sound record reproducer synchronizing apparatus of the character described, means for causing the operation of said projector, means for causing the operation of said reproducer, means actuated by the reproduced sound which it is desired to synchronize with the projector for automatically rendering said sound reproducer operating means ineffective while the projector continues to operate, means to maintain the said sound reproducer operating means ineffective until a predetermined portion of the film in said projector is reached, and means controlled by said film portion for automatically rendering said sound reproducer operating means effective.

19. A motion picture projector adapted to project a film having a portion with which no sound is to be associated, a sound reproducer including a sound track having a portion on which no sound is recorded, said projector and said sound reproducer being adapted to be simultaneously initially operated on said portions, and coacting means on said film and sound track for automatically synchronizing said projector and said reproducer at the termination of the said portions of the said film and sound track.

20. In a motion picture projector and sound record reproducer synchronizing apparatus of the character described a sound track having a portion on which no sound is recorded, pick-up means associated with said sound track, means to move said sound track relative to said pick-up means, sound actuated means to render said last named means ineffective when said pick-up means reaches the end of said portion, and means controlled by the film in said projector to again render said sound track moving means effective when said sound track and film are in synchronism.

21. In a motion picture projector and sound record reproducer synchronizing apparatus of the character described a sound track having a portion on which no sound is recorded, pick-up means associated with said sound track, a motor, a driving train intermediate said motor and said sound track, means to render said driving train effective whereby to move said sound track relative to said pick-up means, sound actuated means to render said driving train ineffective when said pick-up means reaches the end of said portion, and means controlled by the film in said projector to again render said driving train effective when said sound track and film are in synchronism.

22. In a motion picture projector and sound record reproducer synchronizing apparatus of the character described a sound track having a portion on which no sound is recorded, pick-up means associated with said sound track, a motor, a driving train intermediate said motor and said sound track, means to render said driving train effective whereby to move said sound track relative to said pick-up means, sound actuated means to render said driving train ineffective when said pick-up means reaches the end of said portion, and means controlled by the film in said projector to again render said driving train effective when said sound track and film are in synchronism, said motor being oversized whereby said sound track will immediately be driven at its proper speed when said driving train is rendered effective.

23. In a motion picture projector and sound record reproducer synchronizing apparatus of the character described, a record having a sound track on a portion whereof no sound is recorded, pick-up means associated with said sound track, a motor, a driving train intermediate said motor and said sound track, means to render said driving train effective whereby to move said sound track relative to said pick-up means, and sound actuated means for stopping relative movement of said sound track and said pick-up means when said pick-up means reaches the end of said portion, said last named means including means to render said driving train ineffective.

24. In a motion picture projector and sound record reproducer synchronizing apparatus of the character described, a record having a sound track on a portion whereof no sound is recorded, pick-up means associated with said sound track, a motor, a driving train intermediate said motor and said sound track, means to render said driving train effective whereby to move said sound track relative to said pick-up means, and sound actuated means to simultaneously stop relative movement of said sound track and said pick-up means and to render said driving train ineffective when said pick-up means reaches the end of said portion.

25. In a motion picture projector and sound record reproducer synchronizing apparatus of the character described, a record having a sound track on a portion whereof no sound is recorded, pick-up means associated with said sound track, a motor, a driving train including a clutch intermediate said motor and said sound track, means to engage said clutch whereby to move said sound track relative to said pick-up means, and sound actuated means to disengage said clutch when said pick-up means reaches the end of said portion.

26. In a motion picture projector and sound record reproducer synchronizing apparatus of the character described, a record having a sound track on a portion whereof no sound is recorded, pick-up means associated with said sound track, a motor, a driving train including a clutch intermediate said motor and said sound track, means to engage said clutch whereby to move said sound track relative to said pick-up means, and sound actuated means for stopping relative movement of said sound track and said pick-up means, said last named means including means to disengage said clutch.

27. In a motion picture projector and sound record reproducer synchronizing apparatus of the character described, a record having a sound track on a portion whereof no sound is recorded, pick-up means associated with said sound track, a motor, a driving train including a clutch intermediate said motor and said sound track, means to engage said clutch whereby to move said sound track relative to said pick-up means, and sound actuated means to simultaneously stop relative movement of said sound track and said pick-up means and to disengage said clutch when said pick-up means reaches the end of said portion.

28. In a motion picture projector and sound record reproducer synchronizing apparatus of the character described, a record having a sound track on a portion whereof no sound is recorded, pick-up means associated with said sound track, a motor, a driving train intermediate said motor and said sound track, means to render said driving train effective whereby to move said sound track relative to said pick-up means, and sound actuated means to simultaneously stop relative movement of said sound track and said pick-up means and to render said driving train ineffective, said last named means including means to maintain said sound track stationary relative to said pick-up.

29. In a motion picture projector and sound record reproducer synchronizing apparatus of the character described, a record having a sound track on a portion whereof no sound is recorded, pick-up means associated with said sound track, a motor, a driving train including a clutch intermediate said motor and said sound track, means including a solenoid to engage said clutch whereby to move said sound track relative to said pick-up means, and sound actuated means including a second solenoid to disengage said clutch and to stop relative movement between said sound track and said pick-up.

30. In a motion picture projector and sound record reproducer synchronizing apparatus of the character described, a record having a sound track on a portion whereof no sound is recorded, pick-up means associated with said sound track, a motor, a driving train including a clutch intermediate said motor and said sound track, means including a solenoid to engage said clutch whereby to move said sound track relative to said pick-up means, sound actuated means including a second solenoid to disengage the said clutch and to stop relative movement between said sound track and pick-up, means to energize said solenoids, means to de-energize said solenoids as soon as they have performed their functions, and means to maintain said stopping and said clutch actuating means in operative position after said solenoids have been de-energized.

31. In a motion picture projector and sound reproducer synchronizing apparatus of the character described a sound track having a portion on which no sound is reproduced, pick-up means associated with said sound track, means to move said sound track relative to said pick-up means, sound actuated means to abruptly render said last named means ineffective when said pick-up means reaches the end of said portion, and means controlled by the film in said projector to again render said sound track moving means effective when said sound track and film are in synchronism.

32. In a motion picture projector and sound reproducer synchronizing apparatus of the character described a sound track having a portion on which no sound is reproduced, pick-up means associated with said sound track, means to move said sound track relative to said pick-up means at a constant predetermined speed, sound actuated means to abruptly render said last named means ineffective when said pick-up means reaches the end of said portion, and means controlled by the film in said projector to abruptly render said sound track moving means effective at said constant speed when said sound track and film are in synchronism.

DANIEL G. MOORE.